United States Patent [19]
Bettcher et al.
[11] Patent Number: 4,516,323
[45] Date of Patent: May 14, 1985

[54] ROTARY HAND KNIFE AND PARTS THEREFOR

[75] Inventors: Louis A. Bettcher, Amherst; Richard B. Decker, Vermilion, both of Ohio
[73] Assignee: Bettcher Industries, Inc., Birmingham, Ohio

[21] Appl. No.: 534,760
[22] Filed: Sep. 22, 1983

Related U.S. Application Data

[63] Continuation-in-part of Ser. No. 485,738, Apr. 18, 1983, Pat. No. 4,492,027, which is a continuation-in-part of Ser. No. 318,386, Nov. 5, 1981, Pat. No. 4,439,924.

[51] Int. Cl.[3] .......... A22C 17/04
[52] U.S. Cl. .......... 30/276; 17/1 G
[58] Field of Search .......... 30/276, 347; 17/1 G

[56] References Cited

U.S. PATENT DOCUMENTS

| | | | |
|---|---|---|---|
| Re. 25,947 | 12/1965 | Bettcher | 30/276 |
| 2,827,657 | 3/1958 | Bettcher | 17/1 |
| 3,197,808 | 8/1965 | Mears | 17/1 G |
| 3,269,010 | 8/1966 | Bettcher | 30/276 |
| 3,688,403 | 9/1972 | Bettcher | 30/276 |
| 3,852,882 | 12/1974 | Bettcher | 30/276 |
| 4,142,291 | 3/1979 | Bettcher | 30/276 |
| 4,166,317 | 9/1979 | Bettcher | 30/276 |
| 4,170,063 | 10/1979 | Bettcher | 30/276 |
| 4,175,321 | 11/1979 | Bettcher | 30/276 |
| 4,178,683 | 12/1979 | Bettcher | 30/276 |
| 4,198,750 | 4/1980 | Bettcher | 30/276 |
| 4,236,531 | 12/1980 | McCullough | 30/276 |
| 4,363,170 | 12/1982 | McCullough | 30/276 |
| 4,439,924 | 4/1984 | Bettcher | 30/276 |

*Primary Examiner*—Jimmy C. Peters
*Attorney, Agent, or Firm*—Watts, Hoffmann, Fisher & Heinke

[57] ABSTRACT

A rotary hand knife 20 of the type used for trimming meat, fat, and the like, and an improved pinion cap 58 and depth-of-cut gauge 47 for use with the knife. The cap provides a stepped mounting surface 149 for the gauge that forms a passage R for product scrap or slices to pass behind the gauge. The cap also has a lip 154 that blocks entry of product particles into the blade-driving pinion. The gauge has an arcuate portion 47*a* offset toward the blade from a base portion 47*b* that abuts the cap and slides axially on the cap surface to adjust the depth of cut.

14 Claims, 10 Drawing Figures

Fig. 4
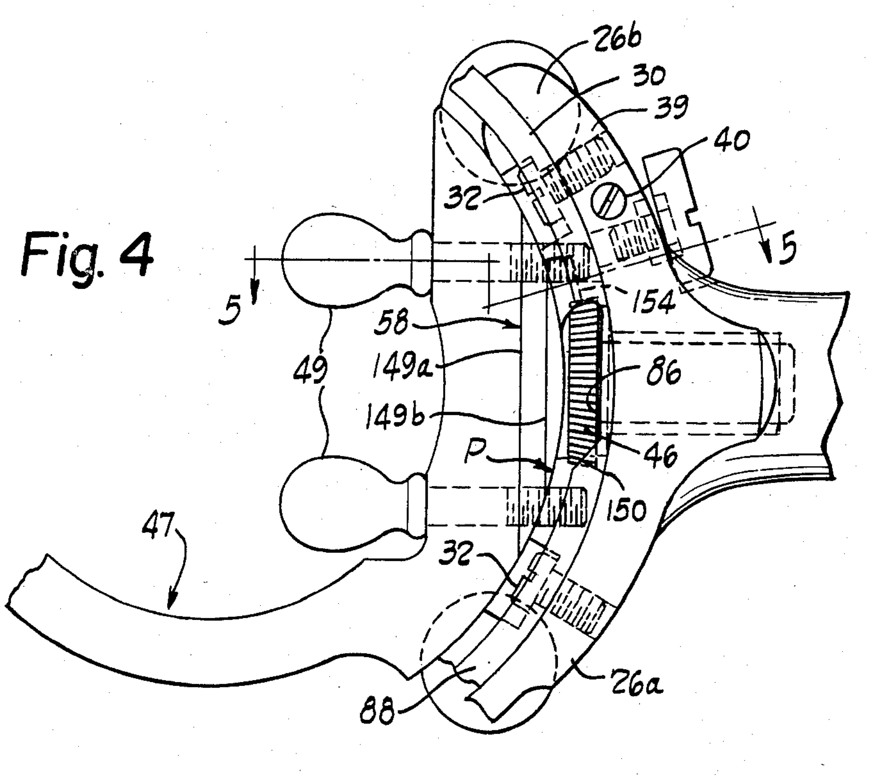
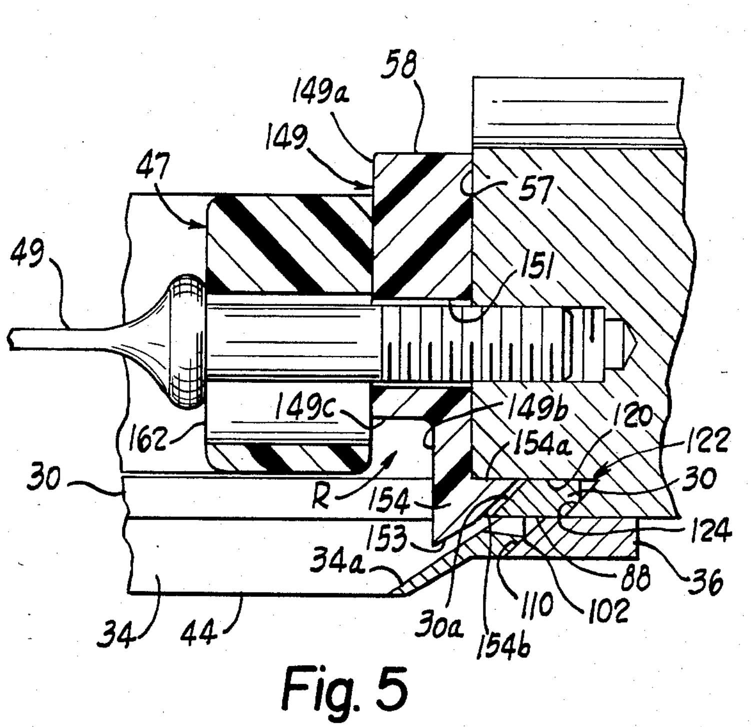
Fig. 5

ROTARY HAND KNIFE AND PARTS THEREFOR

RELATED APPLICATION

This application is a continuation-in-part of application Ser. No. 485,738 filed Apr. 18, 1983, now U.S. Pat. No. 4,492,027, which is a continuation-in-part of application Ser. No. 318,386 filed Nov. 5, 1981, now U.S. Pat. No. 4,439,924, issued Apr. 3, 1984, the disclosures of which are incorporated herein by reference.

TECHNICAL FIELD

This invention relates to an improved hand knife of the type used for trimming and defatting meat with a rotary driven ring-like blade and to an improved gauge and pinion cap therefor.

BACKGROUND ART

Rotary knives with ring-like power-driven blades of the type pertaining to this invention are exemplified by such structures as shown in U.S. Pat. No. Re. 25,947; U.S. Pat. Nos. 4,142,291; 4,166,317, and 4,175,321. Such knives have a rotary ring-like or annular blade, generally frusto-conical in form, sharpened at one axial end and incorporating gear teeth to form a ring gear portion at the other axial end. The ring gear portion is located and guided by a ring-like housing that is secured to a handpiece. The blade is driven by a pinion carried by the handpiece. A flexible cable driven by an external motor, or an air motor incorporated into the handpiece, drives the pinion.

In a construction such as that shown in U.S. Pat. No. Re. 25,947, a disc-like pinion cap secured to the handpiece covers the pinion and overlies a portion of the blade adjacent the gear teeth. A modified cap construction is disclosed and claimed in the above-mentioned copending application Ser. No. 485,738. In constructions such as those shown in the other above-referenced patents, an annular-like gauge member for controlling the depth of cut is secured to the handpiece and has a base portion that covers the pinion in place of the pinion cap and has sufficient height in the axial direction to allow relative adjustment of its position axially of the blade while covering the pinion.

The above-referred to constructions do not fully prevent particles of material being cut from traveling with the blade into the pinion area where they accumulate and interfere with pinion rotation and engagement of the pinion with the gear teeth of the blade. This necessitates disassembly and cleaning during use. In addition, with the gauge set to a position close to the blade, the base of the gauge blocks the path of movement of small scraps or the like that sometimes tend to be carried by the blade. Where the product is firm or hard fat, often chilled, for which knives of this construction are used, this creates no problem; but where wet or soft hams, which are either fresh or salt-cured and have sinew and unchilled fat, are to be trimmed, the scrap material is particularly troublesome and is apt to work behind the gauge or pinion cap through clearances between the housing, blade, and gauge or cap.

DISCLOSURE OF THE INVENTION

In accordance with the present invention an improved pinion cap and an improved depth-of-cut gauge are provided for a rotary hand knife. The cap covers the pinion to guard against fat or other particles entering the pinion area and also acts as a support against and along which the gauge slides axially toward and away from the blade. Adjustment of the gauge relative to the cap changes the depth to which the knife cuts when drawn along and against a product surface.

The improved cap effectively conforms on one side of the pinion to the contour of a gap between the housing, blade, and handpiece of the knife to effectively inhibit entry of scraps of material being cut into the recessed area where the pinion and blade engage while allowing egress on the opposite side of the pinion (considered in the direction of blade travel). In addition, the cap has a stepped front surface facing away from the pinion and toward the center of the blade, which provides a portion directly adjacent the blade that is recessed relative to a portion against which the gauge is supported. The gauge is mounted directly against the front surface of the cap and is movable in an axial direction toward and away from the blade. When adjusted to a position close to the blade, a base portion of the gauge that faces the front surface of the cap overhangs the recessed portion of the cap, providing a passage at the blade surface behind the gauge for scraps or other cut pieces to travel past the handpiece.

The improved gauge provides an arcuate portion offset toward the blade from a base portion that abuts the cap and slides on the front face in a direction axially of the blade to adjust the depth of cut. One end of the base portion facing toward the direction of blade rotation has an inclined surface facing toward the blade to direct oncoming pieces carried by the blade beneath the base portion where they move through the passage formed by the stepped front face of the cap and the overhanging gauge base.

As suggested by the foregoing, the present invention provides an improved hand knife of the type having a rotary ring blade for cutting and trimming meat, fat, and the like, comprising a handpiece having a handle portion, an arcuate portion at one end of the handle portion having a concave arcuate face, and a bore in the handpiece opening through the arcuate face; a drive pinion in the bore for driving a ring blade; a ring-like housing secured to the handpiece adjacent the arcuate portion; a ring blade supported and guided by the housing for rotation about a central axis and having ring gear teeth by which the blade is rotated; and a pinion cap covering at least a major portion of the pinion and in part seated against said concave arcuate face; the pinion cap being of an improved construction having a first portion directly adjacent the blade and a second portion of greater thickness than the first and located axially farther from the blade, said second portion having an outwardly facing surface with straight-line elements extending in the axial direction of the blade and said first portion being inset therefrom. The improved pinion cap, in addition, has a cylindrically curved convex rear surface with a rearwardly extending lip adjacent and at one side only of the pinion, contoured to fit within a gap between the blade housing and handpiece.

The present invention further provides an improved hand knife that additionally includes a ring-like gauge having an arcuate portion that extends circumferentially adjacent to the blade and a base portion with a face that abuts said outwardly facing surface of the second portion of the pinion cap, and means supporting said base portion for adjustable movement axially of the blade relative to said cap, said base portion being spaced from said first portion of the pinion cap when the gauge is adjusted to a position adjacent the blade.

The above and other features and advantages of the invention will become better understood from the detailed description of a preferred embodiment that follows.

BRIEF DESCRIPTION OF THE DRAWINGS

FIG. 4 is a partial plan view similar to FIG. 3 with parts removed;

FIG. 5 is a partial sectional view on an enlarged scale taken along the line 5—5 of FIG. 4;

BEST MODE FOR CARRYING OUT THE INVENTION

Figure 1:
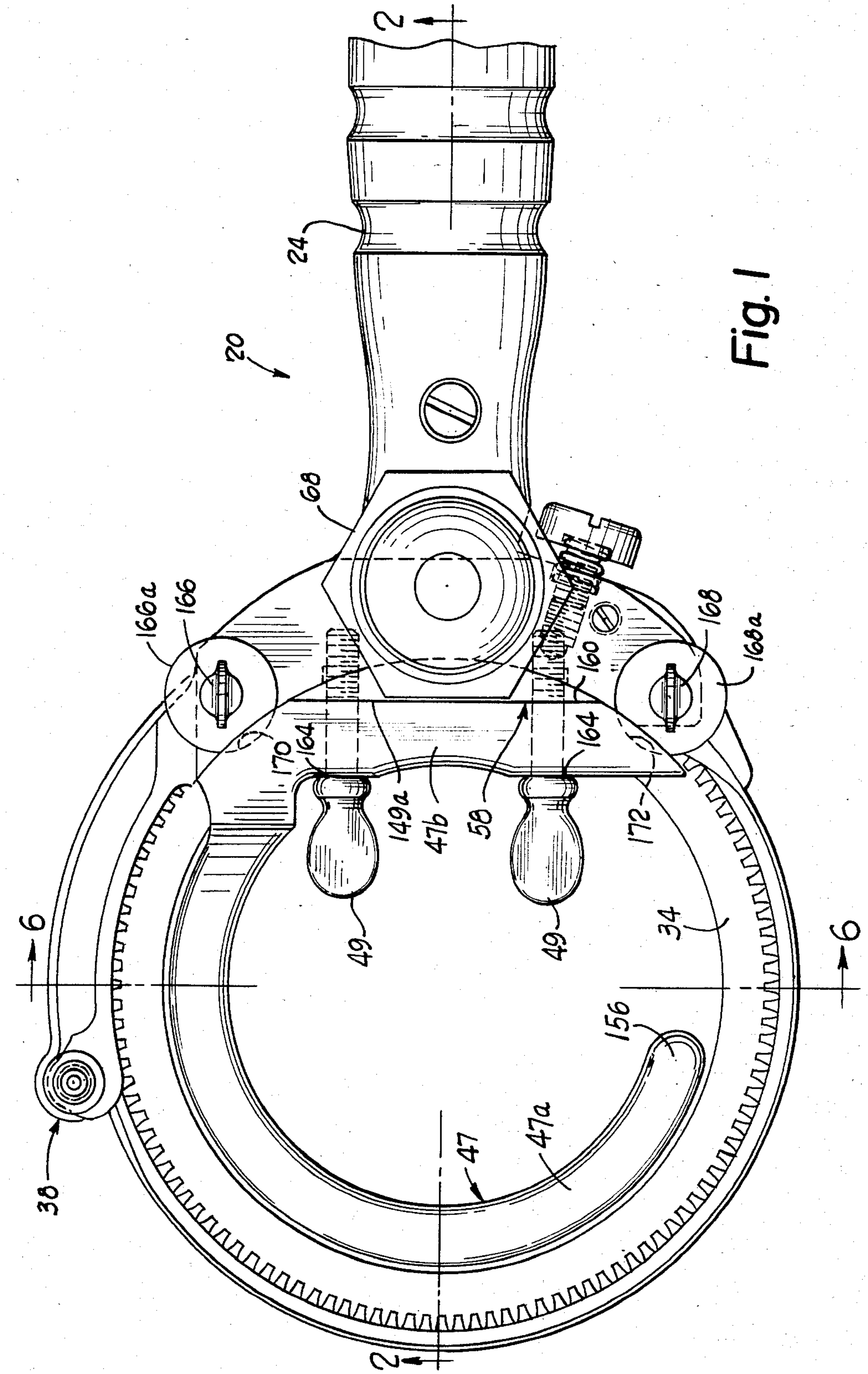
FIG. 1 is a top plan view of a knife embodying the present invention.

A hand knife 20 embodying the invention is best shown in FIGS. 1-6 and comprises a handpiece 22 having a tubular handle 24 and an arcuate end 26 including arm-like sector portions *26a, 26b* (portion *26a* being longer in the preferred embodiment); a ring-like housing 30 secured to the sector portions of the handpiece by two screws 32; a ring-like annular blade 34 rotatable relative to the housing; and a retaining shoe 36 connected to the handpiece by a pivot connection 38 and secured in a blade-retaining position against a front face 39 of the handpiece by a headed screw 40 in the sector portion *26b*. The blade 34 is located and guided in rotation by both the housing 30 and the shoe 36.

Both the housing 30 and blade 34 are of short axial length relative to their diameters. The blade is frustoconical in shape, with gear teeth 42 at the axial end of larger diameter, which is received against the housing, and has a cutting edge 44 formed at the other and smaller axial end, which extends axially from the general plane of the housing 30 and forms the front of the knife 20.

A power driven pinion gear 46 in the handpiece 22 engages the gear teeth 42 and rotates the blade relative to the housing. The pinion is driven by a rotated cable 48 powered by an external electric motor (not shown). Alternatively, the pinion can be powered by an air driven motor and gearing within the tubular handle part 24.

A ring-like depth-of-cut gauge 47 is adjustably secured to the handpiece by finger screws 49 and serves to control the thickness of cuts by limiting the depth to which the blade can be pressed into the product.

In use, the blade 34 is rotated at a relatively high speed in the direction of the arrow A (FIG. 1) and the face of the knife (i.e., the cutting edge 44) is placed against a product, and the knife is drawn along the product in the general direction of the handle, toward the operator, or in a lateral direction across the product, moving part of the blade and housing that are remote from the handle through the product. A resulting slice of the product passes through the central opening 50 of the housing, between the blade and gauge. The construction and shape of the blade and housing facilitate cutting thin layers from the product; for example, patches of skin or thin layers of fat and sinew from the surface of a meat product.

Figure 2:
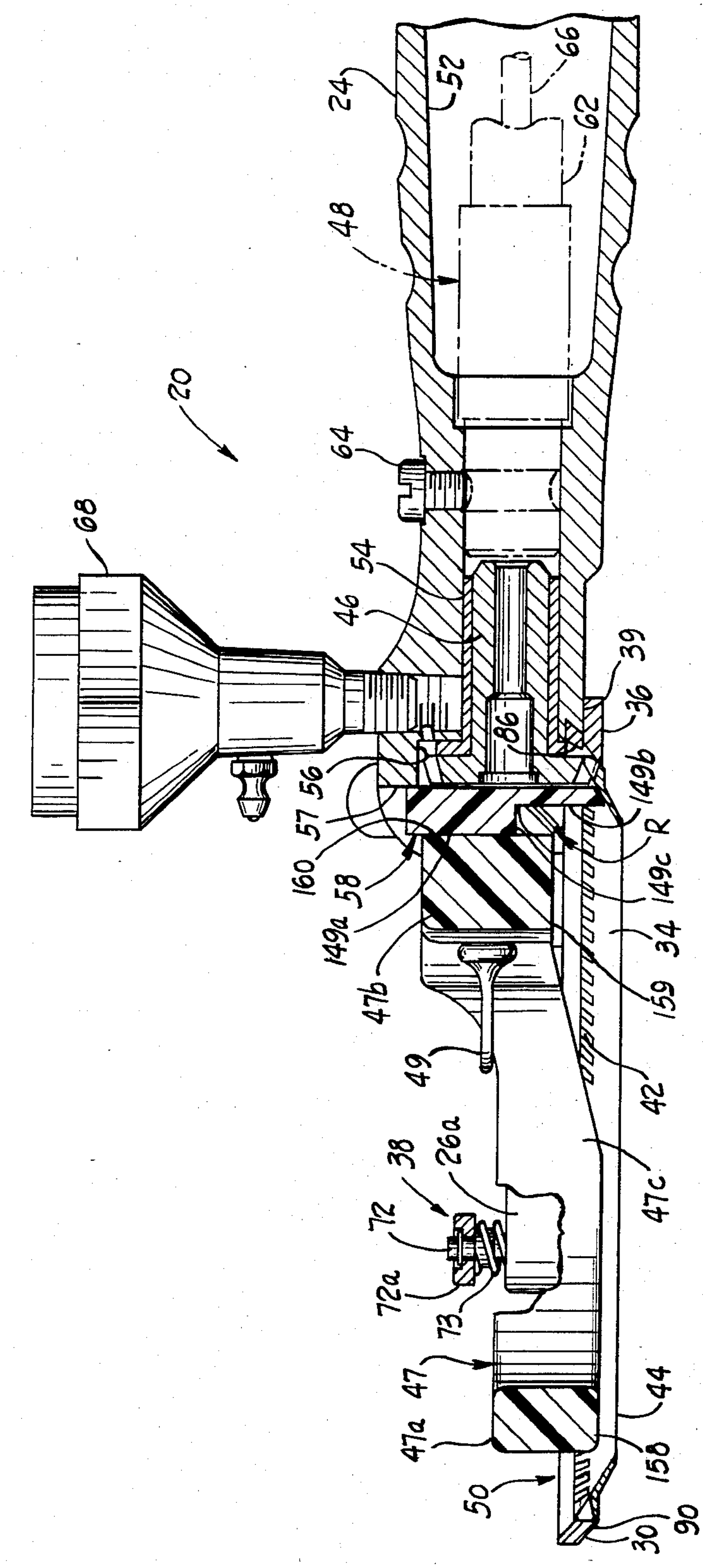
FIG. 2 is a longitudinal sectional view of the knife of FIG. 1 taken along the line 2—2.

As best illustrated in FIG. 2, the handpiece 22 is a metal casting and the tubular handle part 24 has a central recess or bore 52. A flanged tubular bushing 54 is located at the arcuate end of the handpiece. The pinion gear 46 is rotatably supported in the bushing and received in a recess 56 in the arcuate end surface 57 of the handpiece. A plastic cover or pinion cap 58 is secured to the handpiece by the finger screws 49 to cover the pinion gear 46. A flexible cable sheath 62 of the cable 48 is received in the tubular handle part 24 and secured within the handle by a screw 64. A central cable 66 is rotatably housed by the sheath 62 and is secured to the pinion gear 46 to drive the gear when the central cable is rotated by an electric motor (not shown). A grease reservoir 68 on the handpiece communicates with the pinion to provide lubrication.

Figure 6:
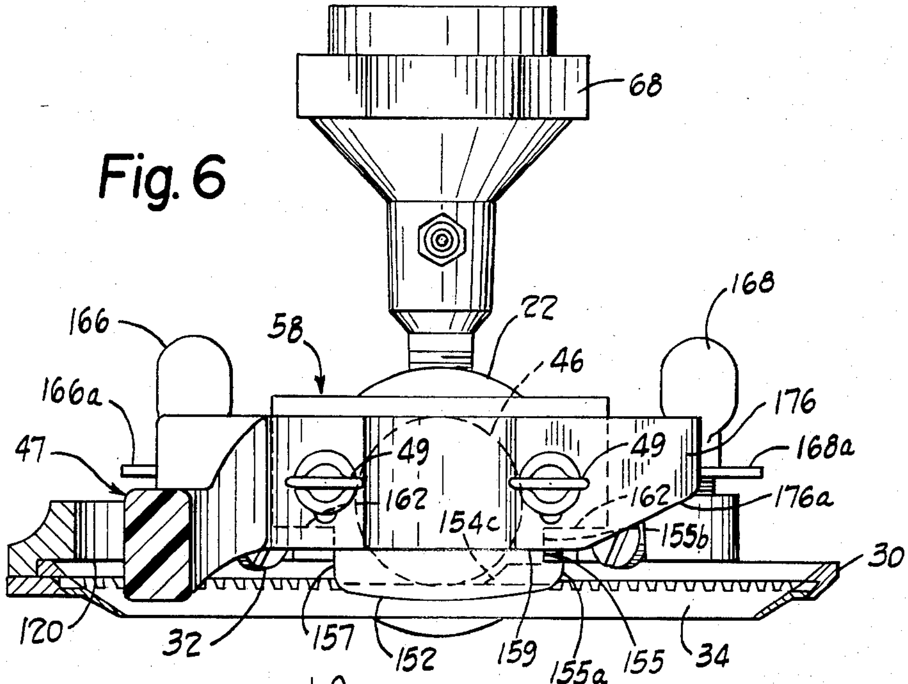
FIG. 6 is a transverse sectional view taken along the line 6—6 of FIG. 1.
Figure 10:
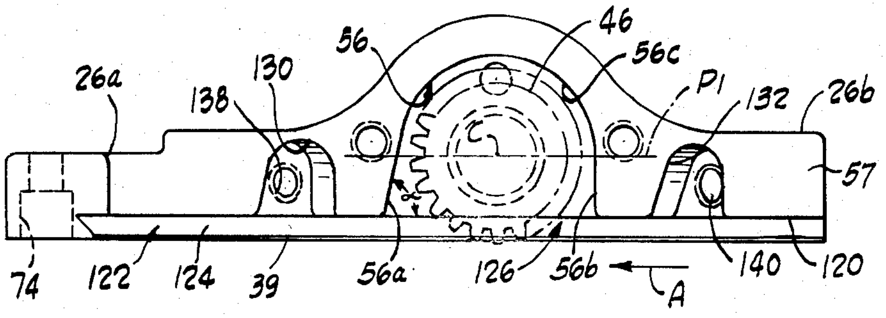
FIG. 10 is an end elevational view of the knife of FIG. 1 with parts removed, showing the arcuate end of the handpiece as viewed from the left side of FIG. 1.

As best shown in FIGS. 5, 6, and 10, the arcuate end formed by sector portions *26a, 26b* has a planar locating surface 120 for the blade housing, which forms one wall of an arcuate recess or groove 122 in which a portion of the housing is received, and has an opposed wall 124, which also forms the recess, being inclined (see FIG. 5) with respect thereto. The recess 56 for the pinion gear opens at 126 (FIG. 10) through the surface 120 and the pinion gear extends through the opening 126 to engage with the gear teeth of the blade 34. As best shown in FIG. 10, the recess 56 is part semi-cylindrical at *56c* but has an outwardly flared portion *56a* at one side only of the opening 126 and a straight portion *56b* perpendicular to the surface 120. In the preferred embodiment shown, the outward flare *56a* extends from a location at or slightly above a location along the periphery of the recess intersected by an imaginary plane P1 parallel to the planar surface 120 and passing through the central axis C of the central bore or recess 52. As shown, the flared portion is formed by a planar wall tangent to the cylindrical wall portion of the recess and extending an angle of 75° with the surface 120. The flared portion is located at the trailing side of the recess 56, considered relative to the direction of blade movement past the recess.

In addition, two recesses 130, 132, (FIG. 10) one on each opposite side of the recess 56 in the arcuate surface 57 and opening through the planar surface 120, receive the heads of the screws 32, which extend beyond the surface 120 to engage and retain the housing against the handpiece.

The cover or pinion cap 58, as best shown in FIGS. 2, 4, 5, and 7-9 has a planar, stepped front face 149, and a cylindrically curved convex rear face 150 that overlies the pinion and that conforms to the curvature of the concave arcuate end surface 57 of the handpiece.

The face 149 is formed of two parallel portions *149a*, *149b* and a perpendicular step portion *149c*. The face portion *149a* includes two apertures 151 for the finger screws 49 and serves as a locating surface for the gauge 47, which is movable in the direction of the blade axis relative to the pinion cap. The step surface *149c* and the face portion 149*b* form a transverse recess R behind the gauge and adjacent the blade 34, when the gauge is adjusted to a position closely adjacent the blade, to allow passage of cut pieces behind the gauge, as may occur if a cut is made with a blade portion near the handpiece, or if a scrap or slice of product is carried by the blade into that area.

Figure 7:
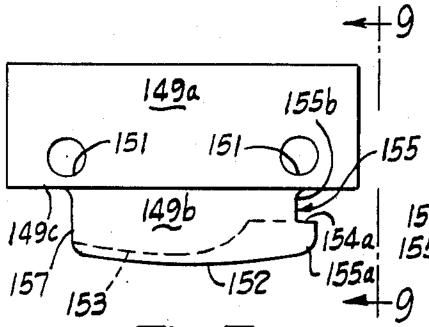
FIG. 7 is a front elevational view of a pinion cap embodying the present invention.
Figure 8:
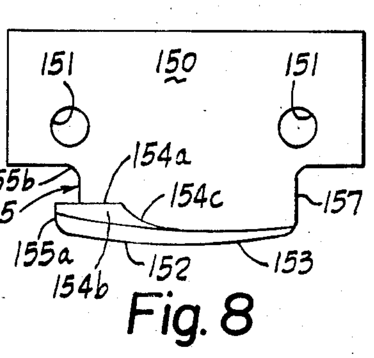
FIG. 8 is a rear elevational view of the pinion cap of FIG. 7.
Figure 9:
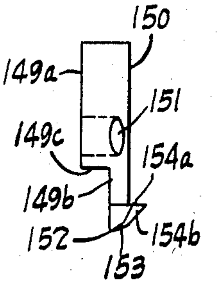
FIG. 9 is a side elevational view of the pinion cap of FIG. 7 viewed from the line 9—9.

By virtue of the greater thickness of the cap 58 behind the face portion 149*a*, the width of the face portion 149*a* in the general direction of the blade movement is greater than the width of the face portion 149*b*, as shown in FIGS. 6–8. Side edges 155,157 are formed at the ends of the face portion 149*b* where the cylindrically curved back surface 150 meets the flat front face. Because the back surface is in contact with the arcuate end surface 57 of the handpiece, the edges 155,157 are flush with the end surface and serve to intercept, deflect away, and prevent entry into the pinion recess of any fat, sinew or other product particles carried by the blade. A lower edge 152 is curved along its length in the plane of the face portion 149*b* and has a rearwardly and upwardly extending beveled surface 153 that is at an angle comparable to that of the upper surface 34*a* of the blade 34, as best shown in FIG. 5, and located close to the blade surface to obstruct passage of particles carried by the blade beneath the cap and into or around the teeth of the pinion. An arcuate lip 154 extends rearwardly from the back surface 150 above and directly adjacent to the beveled surface 153 at one side only of the cap. As best shown in FIGS. 5, 8, and 9, the lip has a flat top surface 154*a* in a plane perpendicular to the front surface portion 149*b* and below the surface 149*c*, and has an arcuate beveled surface 154*b* extending between the surfaces 153 and 154*a*, terminating in a curved end 154*c* that conforms closely to the curvature of the pinion gear 46. The surface 154*a* directly abuts the handpiece surface 120 of the arcuate recess 122 and the beveled surface 154*b* is closely adjacent a beveled inside diameter surface 30*a* of the housing 30. It thereby substantially fills and blocks the remaining portion of the groove 122 that is not occupied by the housing adjacent one side of the pinion. The relationship of the cap and the lip 154 relative to the pinion is shown in FIGS. 4 and 6, which considered along with FIG. 5 illustrate the manner in which the lip obstructs movement of product particles with the blade into the pinion region from one side thereof. Because the lip is on only one side or end of the cap, there is no obstruction in the wedge-shaped recess 122 of the handpiece adjacent the housing 30 on the opposite side of the pinion. This is best shown in FIG. 4, illustating a flared passage P behind the cap to allow escape of any particles that enter the region of the pinion from the opposite side. The depth of the lip 154, being greater than the adjacent cap portions, extends the face portion 149*b* in front of the lip to form an edge portion 155*a* at a location beyond a lateral edge portion 155*b* formed where the cylindrically curved back surface 150 otherwise joins the planar front surface portion 149*b*, as best shown in FIGS. 6, 7, and 8. The edge portion 155*a* is blunt, as shown in FIG. 9, whereas the edge portion 155*b* is knife-like as is edge 157.

Figure 3:
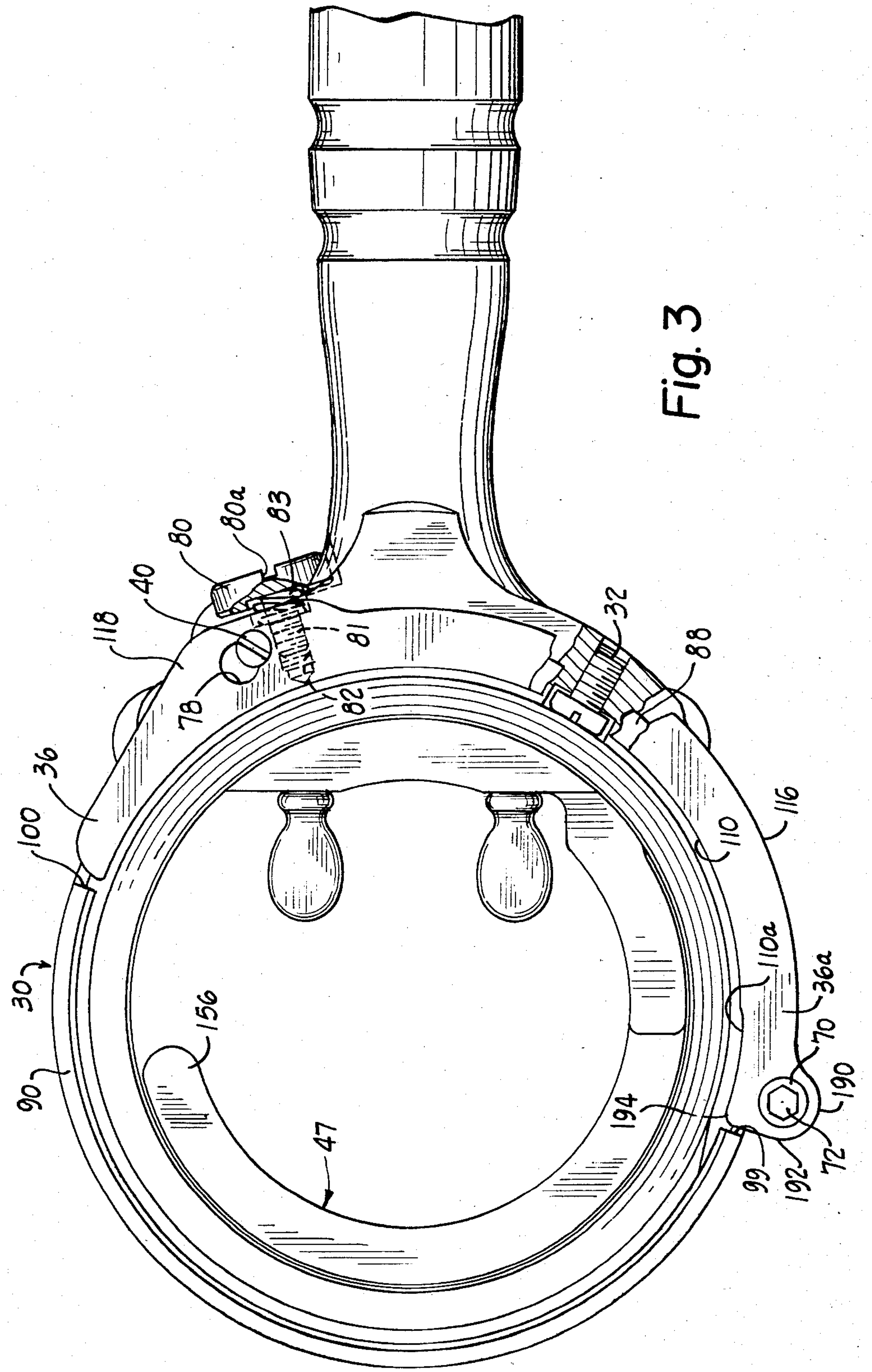
FIG. 3 is a bottom plan view of the knife in FIG. 1 showing the front or working face of the knife.

The gauge 47 is a generally annular structure with an arcuate depth-of-cut controlling portion 47*a* and a substantially straight base portion 47*b* by which the gauge is supported and properly positioned against the surface 149*a* of the pinion cap by the finger screws 49. In the preferred embodiment, the gauge is not a complete annulus, but rather the arcuate portion 47*a* is cantilevered from the base, extends somewhat more than 180 degrees, and has a terminus 156 spaced from the base, as best shown in FIGS. 1 and 3. The radius of curvature of the arcuate portion 47*a* at the outside surface is slightly less than the radius of the cutting edge 44 of the blade 34 in the preferred embodiment. In cross sectional shape, the portion 47*a* is substantially rectangular, with rounded corner portions. As shown in FIG. 2, the arcuate portion 47*a* is offset from the base portion 47*b* closer to the blade 34 in the axial direction of the blade. Thus, the product engaging surface 158 that limits the depth of cut is closer to the blade than is the parallel blade-facing surface 159 of the base portion 47*b*. A transition portion 47*c* arcuate in plan and inclined in elevation extends from the surface 159 to the surface 158.

The base portion 47*b* has a planar mounting surface 160 that fits flushed against the surface portion 149*a* of the cap 58. As shown in FIG. 1, the length of the surface 160 is coextensive with that of cap portion 149*a*, but as shown in FIG. 2, the height is somewhat greater. Slots 162 of a width equal to the diameter of the threaded shanks of the finger screws 49 and of height somewhat greater, allow for movement of the gauge relative to the cap in the axial direction of the blade to vary the gap 50 between the blade and gauge. Movement is achieved by loosening the fingerscrews, each of which has a clamping face 164 that acts against the base portion of the gauge, and by rotating finger adjustment screws 166 and 168 carried in the arcuate section 26*a*, 26*b*, respectively, of the handpeice. The screws 166, 168 are received in threaded bores extending in the axial direction of the blade and have large, circular, disc-like flanges 166*a*, 168*a*, a portion of each of which is received in a respective groove 170, 172 in the outer peripheral surface of the base portion 47*b* and which carry the gauge axially as the screws are rotated. In the fully raised position of the gauge, the surface 159 is essentially coplanar with the surface 149*c* of the pinion cap and is sufficiently spaced from the blade to avoid obstructing scraps or slices of product cut by the blade and carried past the base portion of the gauge. When the gauge is adjusted to a position closely adjacent the blade, as shown in FIGS. 2 and 5, the inset position of the face portion 149*b* producing the recess R between the extending surface 160 of the gauge and face portion 149*b* provides a passage for the material, which would otherwise build up and possibly work its way into the pinion recess behind the cap 58.

One end 176, of the base portion 47*b* of the gauge, which faces in the on-coming direction of the blade, has an inclined surface 176*a* that is farthest from the blade 34 at the end and slopes toward the blade in a direction inwardly from the end, i.e., in the direction of blade rotation. This surface 176*a* deflects scraps of product carried by the blade and causes them to pass between the gauge surface 159 and the blade 34 rather than accumulating at the base of the gauge.

In the preferred embodiment both the gauge 47 and the pinion cap 58 are of nylon.

The pivot connection 38 at the end of the sector portion 26*a* (FIGS. 1, 2 and 3) is comprised of an internally threaded bushing 70 secured to one end of the retaining shoe 36, a screw 72 with a threaded collar 72*a*, and a spring 73 surrounding the screw and acting between the collar and the handpiece. The bushing is received in a hole 74 (FIG. 10) through the sector and the collar on the screw 72 that is received in the bushing acts against the spring on the opposite side from the retaining shoe. By pushing the collar toward the sector, the retaining shoe and bushing are moved axially against the resistance of the spring 73 to move the shoe away from the front face 39 of the handpiece, so a portion of the shoe adjacent the pivot axis is moved out of the plane of the knife blade to allow the shoe to pivot about the axis of the screw 72 for blade removal.

The securing screw 40 in the front face of the sector portion **26*b* secures the distal end of the shoe 36 by cooperating with a keyhole slot 78** in the shoe. The slot is elongated in a direction that allows the shoe to pivot a short distance toward and away from the blade while the screw is received in the slot.

A hand wheel or adjustment knob 80 with a shaft 81 is received in a threaded aperture 82 in the sector portion **26*b*. The hand wheel acts as an abutment to the shoe 36 for adjusting and maintaining the position of the shoe relative to the blade. A spring 83 surrounding the shaft 81 and acting against the hand wheel and sector portion 26*b* holds the hand wheel in adjusted position. The periphery of the hand wheel is smooth to prevent accidental adjustment if the operator's thumb or finger moves across the periphery during use of the knife. A slot 80*a*** is provided in the face of the hand wheel to facilitate adjustment.

The blade housing 30 is circular in shape and has varying cross sectional shapes at different portions. The heads of the two securing screws 32 fit against flats in the inside periphery of the housing, the screws being received in threaded apertures 138,140 in the arcuate end 26 of the handpiece. The housing has a cut away portion 86 (FIGS. 2 and 4) to receive the pinion gear 46, allowing it to extend through the plane of the housing and cooperate with the gear teeth of the blade 34. The housing has a radial face 88 at the front (FIG. 4), against which the blade 34 is located and against which it slides in rotation. The radial face varies in width circumferentially of the housing, being wider in that portion of the housing adjacent the arcuate end 26 of the handpiece, and being thinner along that part of the housing that extends beyond the arcuate end 26 of the handpiece.

A peripheral flange 90 extends about the radial face 88 in that portion of the housing that extends beyond the arcuate end 26 (i.e., beyond the sector portions **26*a*, 26*b*). The circumferential extent of the peripheral flange is no more than 180° about the housing. Ends 99, 100 of the peripheral flange are shown in FIG. 3, and in the preferred embodiment are substantially diametrically opposite each other and directly adjacent the ends of sector portions 26*a*, 26*b***.

The blade 34 is located with the gear teeth portion 42 against the radial face 88 of the housing, and in part captured by the peripheral flange 90. As best shown in FIGS. 3 and 5, the retaining shoe 36 rests against the radial face 88 of the housing and also against an outer frusto-conical surface 102 of the blade 34.

The retaining shoe 36 is in the form of an arcuate plate substantially congruent with and overlying the front face 39 at the arcuate end 26 of the handpiece 22. An inner edge 110 of the shoe is beveled to correspond with the frusto-conical peripheral surface portion 102 of the blade and is shaped to the same radius of curvature so it bears against that blade portion when positioned with the center of curvature coincident with that of the blade center. In such a position, the keyhole slot 78 receives the headed securing screw 40. An enlarged portion of the keyhole slot is larger than the head of the securing screw 40, and a narrower portion receives the shank of the screw 40 when the shoe is located to contact the blade. In that position, the head of the screw prevents movement of the shoe away from the front face 39 of the handpiece.

A slightly recessed edge portion **110*a* of the shoe prevents binding against the blade at the pivoted end 36*a*, but the depth of the recess is minimized to be certain the shoe along the portion 110*a* completely covers the teeth 42 of the blade 34 to inhibit the teeth from contacting the product being cut and carrying particles into the pinion gear and its recess. The portion 110*a* is concentric with the edge 110** but the curvature is of slightly greater radius (no more than 0.05 inch greater in the preferred embodiment).

A lobe 190 is located at the end **36*a* to accommodate the bushing 70. The shoe terminates at the end 36*a* in an edge 192 that extends substantially radially of the shoe curvature and a rounded juncture 194 of small radius is formed with the inner edge portion 110*a* of the shoe so the edge 192 of the shoe is directly adjacent the housing flange 90 and covers the teeth of the blade 34 so that no more than a tooth width is exposed at the juncture. At the opposite end 36*b* the shoe also is located directly adjacent the housing flange so no more than a tooth width is exposed. This arrangement inhibits the blade teeth from engaging product particles and carrying them with the blade into the drive mechanism. Pressing on the screw collar 72*a* at pivot 38 moves the shoe away from the face 39 of the handpiece to allow movement of the shoe over the head of the securing screw 40 and to allow the portion of the shoe at the rounded juncture 194 to move away from (i.e., out of the plane of) the blade so when the shoe pivots away from the arcuate end 26 and the juncture 194 moves toward the blade, there will be no interference between the juncture 194** and the blade.

An outer edge 116 of the shoe 36 has a lobe 118 providing a wider part of the shoe that extends beyond the sector portion **26*b* and is engaged by the hand wheel 80. Once the screw 40 is received in the keyhole slot 78, the hand wheel is adjusted to hold the shoe with a narrower portion of the slot under the screw head. Also, the hand wheel forces the inside beveled edge of the shoe against the blade holding the blade in captured relationship to the housing flange 90**. Any play between the blade and the housing flange is taken up by adjustment of the hand wheel, which also applies proper force to allow rotation of the blade relative to the housing.

To remove the blade from the housing, the hand wheel is rotated to back it away from the shoe, allowing the shoe to be pivoted about the pivot assembly 38, bringing the enlarged portion of the slot 78 into alignment with the screw head. The shoe is moved away from the front face of the handpiece, beyond the screw 40, and is then pivoted away from the blade. The blade can then be moved out of the peripheral flange 90, toward the handle part 24 and lifted away from the housing and handpiece. A new blade is inserted by reversing the procedure. In this way, an operator can readily change blades without the use of tools or complex adjustments and frequent blade change is thereby encouraged and greater cutting efficiency achieved.

While a preferred embodiment of the invention has been described with particularity, it will be understood that modifications can be made therein without departing from the spirit and scope of the invention set forth in the appended claims.

We claim:

1. In a hand knife of the type having a rotary ring blade for cutting and trimming meat, fat, and the like, comprising a handpiece having a handle portion, an arcuate portion at one end of the handle portion having a concave arcuate face and a recess in the handpiece opening through the arcuate face; a ring-like housing secured to the handpiece adjacent the arcuate portion; a ring blade supported and guided by the housing for rotation about a central axis and having ring gear teeth by which the blade is rotated; a drive pinion in the recess for driving the ring blade; and a pinion cap covering at least a major portion of the pinion and in part seated against said concave arcuate face; the improvement wherein the pinion cap has a first portion directly adjacent the blade and a second portion of greater thickness than the first and located axially farther from the blade, said second portion having an outwardly facing surface with straight-line elements extending in the axial direction of the blade and said first portion being inset therefrom.

2. A hand knife as set forth in claim 1 including a ring-like gauge having an arcuate portion that extends circumferentially adjacent to the blade and a base portion with a face that abuts said outwardly facing surface of the second portion of the pinion cap, and means supporting said base portion for adjustable movement axially of the blade relative to said cap, said base portion being spaced from said first portion of the pinion cap when the gauge is adjusted to a position adjacent the blade.

3. A hand knife as set forth in claim 2 wherein said arcuate portion is located axially closer to the blade than the base portion.

4. A hand knife as set fourth in claim 1 wherein the length of said first portion is less than that of the second portion in a direction parallel to the plane of the blade and a lip projects from the cap in a direction rearwardly from the first portion at an edge thereof adjacent the blade, said lip being located to one side only of an axial plane through the pinion and blade, and substantially blocking a peripheral groove between the handpiece and blade housing adjacent the ring gear teeth of the blade to one side of the pinion.

5. In a hand knife of the type having a rotary ring blade for cutting and trimming meat, fat, and the like, comprising a handpiece having a handle portion, an arcuate portion at one end of the handle portion having a concave arcuate face and a recess in the handpiece opening through the arcuate face; a ring-like housing secured to the handpiece adjacent the arcuate portion; a ring blade supported and guided by the housing for rotation about a central axis and having ring gear teeth by which the blade is rotated; a drive pinion in the recess for driving the ring blade; and a pinion cap covering at least a major portion of the pinion and in part seated against said concave arcuate face; the improvement wherein the pinion cap has a cylindrically curved rear surface contacting said arcuate face, a front surface that intersects the rear surface at opposite sides of the cap and that is flush at said opposite sides with said arcuate surface, and a portion projecting from said rear surface adjacent one side only of said recess, received in a groove between the housing and arcuate portion of the handpiece adjacent the blade.

6. A hand knife as set forth in claim 5 wherein the pinion cap has a first portion directly adjacent the blade and a second portion of greater thickness than the first located axially farther from the blade, said second portion having an outwardly facing surface with straight-line elements extending in the axial direction of the blade and said first portion being inset therefrom.

7. A pinion cap for a hand knife having a rotary ring-like blade with ring gear teeth, said cap serving to cover a pinion that engages the blade and that is recessed in a handle portion of the knife, said cap having first and second portions of different thickness each extending the entirety of one dimension of the cap and along only a part of a second dimension taken at a right angle to said one dimension, the first portion being thinner than the second and the second having a face comprised of straight-line elements extending in the direction of said second dimension.

8. A pinion cap as set forth in claim 7 wherein said first and second portions together form a single convex surface cylindrically curved with an axis parallel to the straight-line elements of said face of the second portion.

9. A pinion cap as set forth in claim 7 wherein the first portion has a face comprised of straight-line elements extending in the direction of said second dimension.

10. A pinion cap as set forth in claim 9 wherein said faces comprised of straight-line elements are planar and in different parallel planes.

11. A pinion cap as set forth in claim 8 including a lip extending from said convex surface at one side only of a centerline that bisects said first and second portions.

12. A gauge for a rotary ring blade hand knife that has a handle portion, a circular housing supported on the handle portion, and a ring blade rotatably guided by the housing, said gauge having an arcuate portion and a connected base portion, the arcuate portion having a surface that lies in a radial plane and the base portion being displaced axially from the plane and having a mounting surface with straight line elements extending in the axial direction, and means facilitating mounting of said gauge on a hand knife for adjusting movement relative to the knife in said axial direction.

13. A gauge for a rotary ring blade hand knife that has a handle portion, a circular housing supported on the handle portion, and a ring blade rotatably guided by the housing, said gauge having an arcuate gauge portion and an elongated straight base portion offset therefrom in a direction axially of the arcuate portion, a sloped connecting portion between the arcuate and straight portions, and apertures extending transversely through the straight portion elongated in said axial direction to facilitate securing the gauge to a knife for adjustment in the axial direction.

14. A method of preventing entry of product particles, scraps, and the like into a pinion gear recess of a rotary hand knife during use, comprising the steps of covering the recess with a cap flush with surfaces surrounding the recess to direct particles, scraps, and the like away from the recess and to inhibit passage of particles behind the cap and into the recess, filling a groove that enters the recess on a side of the recess from which the particles, scraps, and the like approach during use, to inhibit entry to the recess from one side thereof, while leaving a groove that exits the recess on an opposite side of the recess unfilled to permit egress of any particles that enter the recess.

* * * * *